United States Patent [19]
Fore

[11] Patent Number: 5,327,667
[45] Date of Patent: Jul. 12, 1994

[54] DEVICE FOR LURING DEER

[76] Inventor: John C. Fore, 33203 Highway 1019, Denham Springs, La. 70726

[21] Appl. No.: 167,208

[22] Filed: Dec. 16, 1993

[51] Int. Cl.⁵ ............................................. A01M 31/00
[52] U.S. Cl. ............................................ 43/1; 604/306
[58] Field of Search ............... 43/1; 2/171.2; 604/304, 604/305, 306

[56] References Cited

U.S. PATENT DOCUMENTS

| | | | |
|---|---|---|---|
| 2,340,142 | 1/1944 | Rauner | 604/306 |
| 2,579,403 | 12/1951 | Slomowitz | 604/306 |
| 3,306,292 | 2/1967 | Spees | 604/306 |
| 3,580,254 | 5/1971 | Stuart | 604/306 X |
| 4,707,450 | 11/1987 | Nason | 604/3 X |

Primary Examiner—P. Austin Bradley
Assistant Examiner—Jeanne M. Elpel
Attorney, Agent, or Firm—Reginald F. Roberts, Jr.

[57] ABSTRACT

A device and method for luring deer. The device includes first and second flexible strips. The first strip has first and second ends, and an absorbent middle portion. The second strip has first and second ends, and an absorbent middle portion. The first end of the first strip is attached to the first end of the second strip, and the second end of the first strip is attached to the second end of the second strip. A fragrant liquid having a scent which attracts deer is sealed in a brittle container, which is sandwiched between the absorbent portions of the strips. When the container is crushed, the liquid escapes and is absorbed by the strips, from which it emits a scent which lures deer to the site from which the scent is coming.

12 Claims, 3 Drawing Sheets

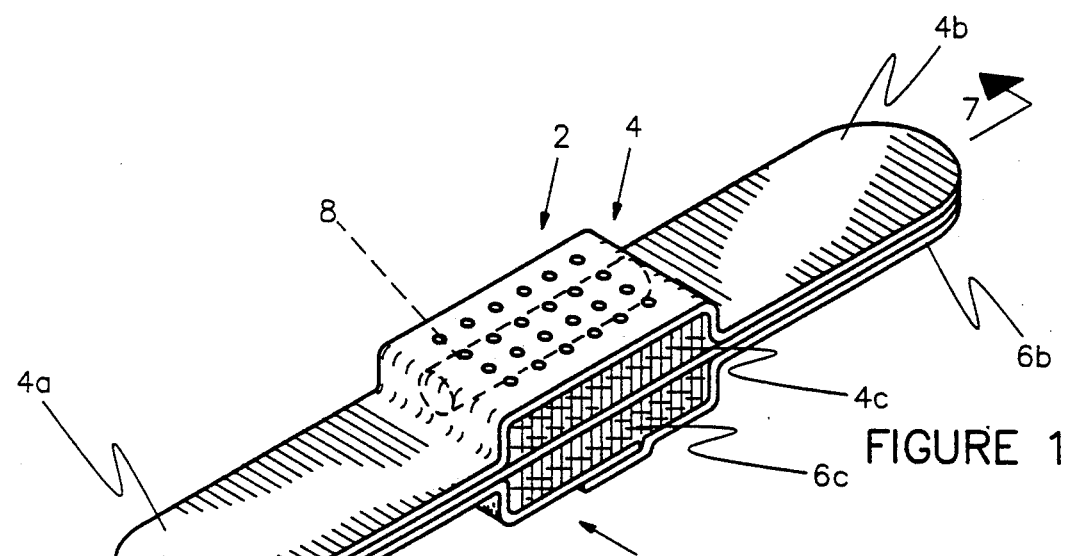
FIGURE 1
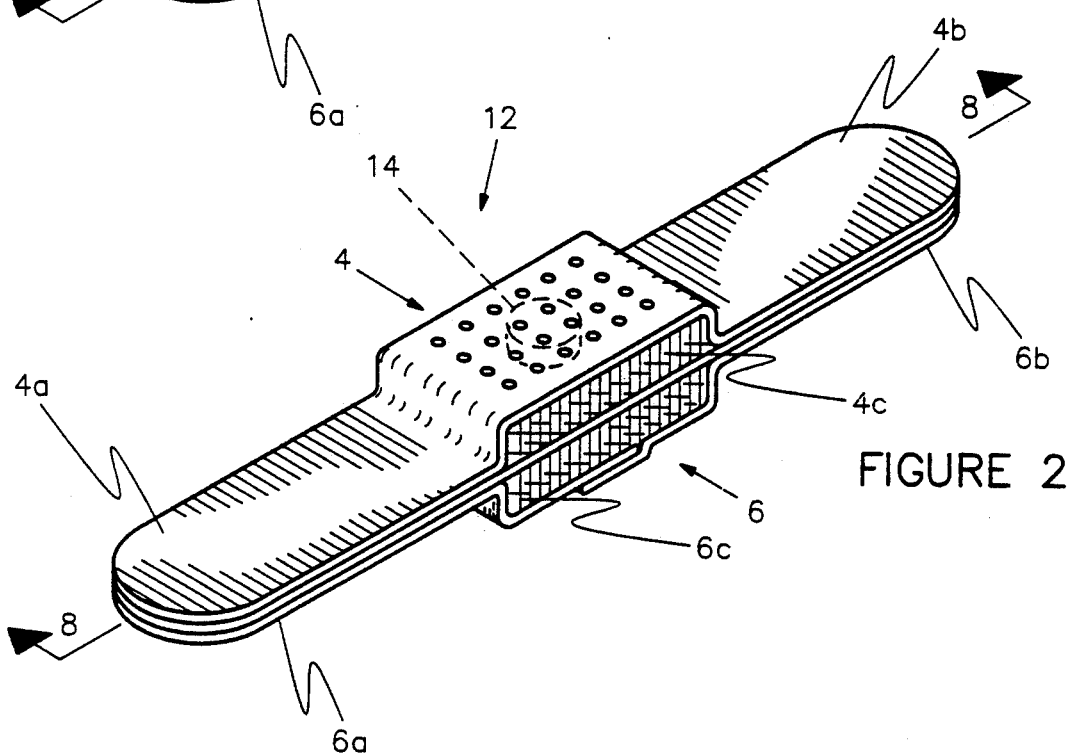
FIGURE 2
FIGURE 3

DEVICE FOR LURING DEER

BACKGROUND OF THE INVENTION

The present invention relates to animal bait. More particularly, the invention relates to a device and method for luring deer.

Deer feeders are commonly used for this purpose. However, such feeders are expensive to build and maintain, and are not portable. A need exists, therefore, for a portable, inexpensive device for luring deer to a hunter. The present invention provides such a device, as well as a method for using the device to attract deer.

SUMMARY OF THE INVENTION

In general, the present invention in one aspect provides a device for luring deer. The device comprises first and second flexible strips. The first strip has first and second ends, and an absorbent middle portion. The second strip has first and second ends, and an absorbent middle portion. The first end of the first strip is attached to the first end of the second strip, and the second end of the first strip is attached to the second end of the second strip. A sealed, brittle member is disposed between the first and second strips. A fragrant liquid is disposed in and contained by the sealed, brittle member.

In a second aspect the invention provides a method for luring deer. The method comprises sealing a fragrant liquid in a brittle container, and disposing the brittle container between first and second strips of a flexible material. The first strip has first and second ends, and an absorbent middle portion. The second strip has first and second ends, and an absorbent middle portion. The first end of the first strip is attached to the first end of the second strip, and the second end of the first strip is attached to the second end of the second strip. The method further comprises crushing the brittle container, thereby causing the fragrant liquid to escape and be absorbed by the absorbent middle portion of each strip, and to emit a fragrant odor from the liquid and from the absorbent middle portions of the strips.

BRIEF DESCRIPTION OF THE DRAWINGS

FIG. 1 is an isometric view of a first embodiment of a deer lure, made in accordance with the principles of the present invention.

FIG. 2 is an isometric view of a second embodiment of a deer lure, made in accordance with the principles of the present invention.

FIG. 3 is a top view of the first embodiment of a deer lure shown in FIG. 1.

DETAILED DESCRIPTION OF THE INVENTION

Figure 4:
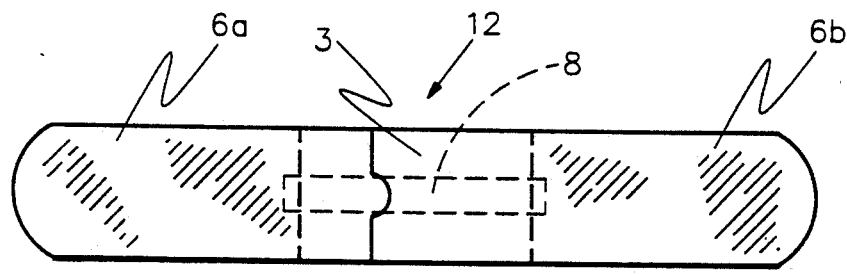
FIG. 4 is a bottom view of the first embodiment of a deer lure shown in FIG. 1.
Figure 5:
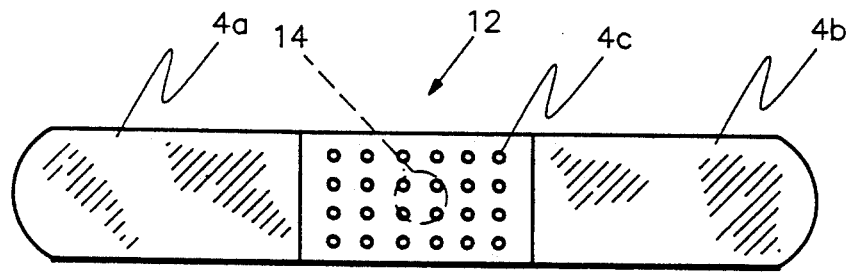
FIG. 5 is a top view of the second embodiment of a deer lure shown in FIG. 2.
Figure 6:
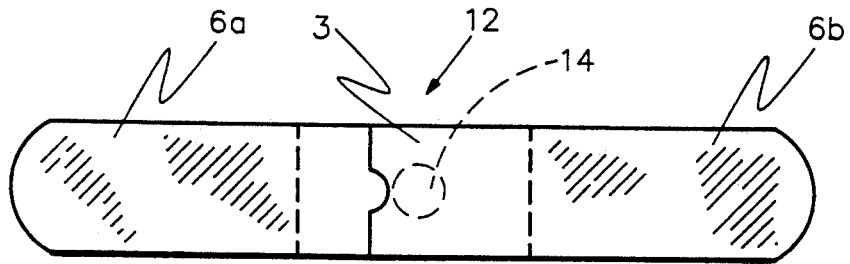
FIG. 6 is a bottom view of the second embodiment of a deer lure shown in FIG. 2.
Figure 7:
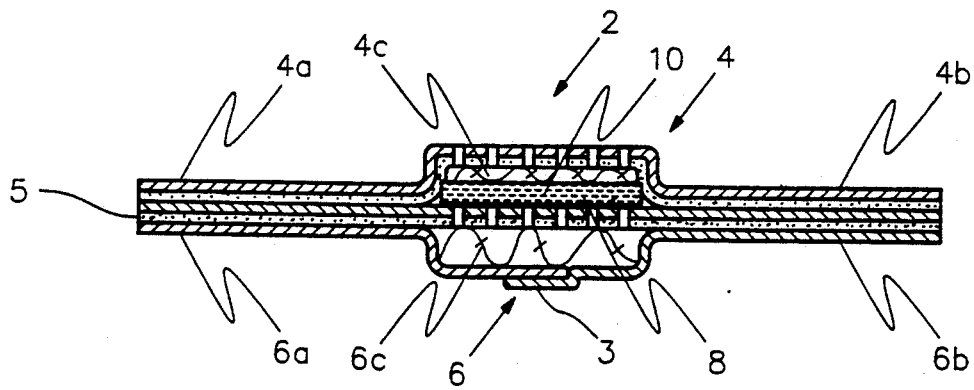
FIG. 7 is a cross-sectional view of the deer lure shown in FIG. 1, taken along the cutting line 7—7.
Figure 8:
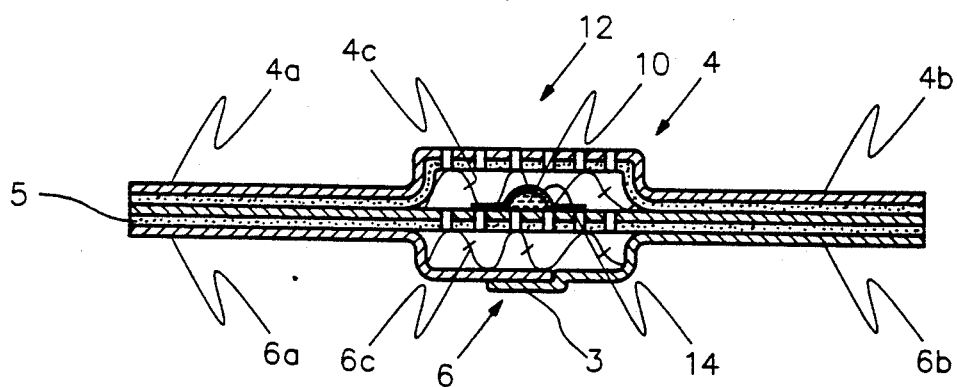
FIG. 8 is a cross-sectional view of the deer lure shown in FIG. 2, taken along the cutting line 8—8.

More specifically, reference is made to FIGS. 1, 3, 4, and 7, in which is shown a first embodiment of a deer lure made in accordance with the principles of the present invention, and generally designated by the numeral 2.

The deer lure 2 comprises first and second flexible strips 4 and 6 having first and second ends 4a, 4b, 6a, 6b, and absorbent middle portions 4c, 6c. The first and second strips 4 and 6 include an adhesive material 5. To prevent the adhesive material 5 from adhering prematurely to an object, the strips 4 and 6 are provided with protective tabs 3 which are peeled off in preparing the deer lure 2 for use. The tabs 3 have been removed from the first strip 4 but not from the second strip 6.

A sealed, brittle tube 8 which encloses and contains a fragrant liquid 10 is disposed between the first and second strips 4 and 6, preferably between the absorbent middle portions 4c and 6c. Using the adhesive material 5, the first end 4a of the first strip 4 is attached to the first end 6a of the second strip 6, and the second end 4b of the first strip 4 is attached to the second end of the second strip 6, thereby holding the tube 8 between the first and second strips 4 and 6. Preferably, the tube 8 is attached to the first and second strips 4 and 6, using the adhesive material 5, thereby holding the tube 8 more securely between the strips 4 and 6.

Reference is now made to FIGS. 2, 5, 6, and 8, in which is shown a second embodiment of a deer lure made in accordance with the principles of the present invention, and generally designated by the numeral 12. In this embodiment a brittle ampul 14 containing the fragrant liquid 10 is disposed between the first and second strips 4 and 6, preferably between the absorbent middle portions 4c and 6c. Using the adhesive material 5, the first end 4a of the first strip 4 is attached to the first end 6a of the second strip 6, and the second end 4b of the first strip 4 is attached to the second end 6b of the second strip 6, thereby holding the ampul 14 between the first and second strips 4 and 6.

Figure 9:
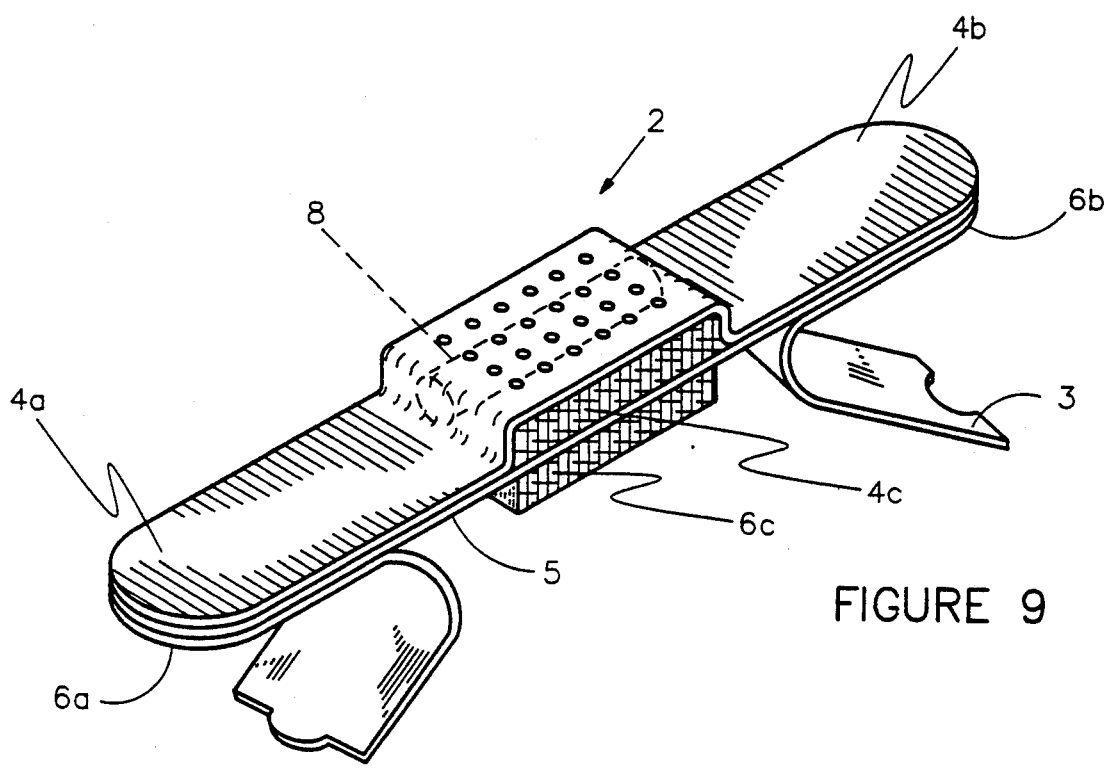
FIG. 9 is an isometric view of the deer lure shown in FIG. 1, showing the lure being prepared for use.

Reference is now made to FIG. 9, in which is shown the first embodiment of the lure 2 shown in FIGS. 1, 3, 4, and 7 being prepared for use in a deer hunt. The tabs 3 of the second strip 6 have been peeled back to expose the adhesive material 5 for attachment of the deer lure 2 to an article of clothing worn by a hunter.

Figure 10:
FIG. 10 is an isometric view of the deer lure shown in FIGS. 1 and 9 in actual use.

Reference is now made to FIG. 10, in which is shown the first embodiment of the deer lure 2 shown in FIGS. 1, 3, 4, 7, and 9 after the lure 2 has been attached to a boot 16 of a hunter (not shown). A similar procedure is used i n preparing and using the lure 12 shown in FIGS. 2, 5, 6, and 8.

The fragrant liquid 10 masks the human scent of a deer hunter and emits an odor which attracts deer. The liquid is selected from the group consisting of urine, nut scent, and pine scent. Preferably, the liquid is selected from the group consisting of deer urine, raccoon urine, fox urine, acorn scent, and pine scent, all of which are commercially available.

While any brittle material may be used to fabricate the brittle tube 8 and/or the brittle ampul 14, it is preferable that the tube 8 and ampul 14 be made of glass The tube 8 is sealed by heat or with wax or a silicon-based sealant, both of which are commercially available. The ampul 14 is heat-sealed.

The absorbent middle portions 4c and 6c of the first and second strips 4 and 6 are padded with an absorbent material. The preferred absorbent material is absorbent cotton.

Although many different kinds of material may be used to fabricate the deer lures 2, 12, a convenient and readily-available strip 4, 6 is marketed as BAND-AID, a registered trademark of Johnson & Johnson Products, Inc. New Brunswick, N.J. 08903.

I claim:

1. A deer lure, comprising:
    (a) a first flexible strip;
    (b) a second flexible strip;
   the first strip having first and second ends, and an absorbent middle portion; the second strip having first and second ends, and an absorbent middle portion; the first end of the first strip being attached to the first end of the second strip, and the second end of the first strip being attached to the second end of the second strip;
    (c) a sealed, brittle member disposed between the first and second strips; and
    (d) a fragrant liquid disposed in and contained by the sealed, brittle member.

2. The deer lure of claim 1, wherein:
    (e) the first and second strips include an adhesive material; and
    (f) the adhesive material is used to attach the first and second ends of the first and second strips to one another.

3. The deer lure of claim 1, wherein:
    (e) the fragrant liquid has a scent which attracts deer.

4. The deer lure of claim 1, wherein:
    (e) the fragrant liquid is selected from the group consisting of urine, nut scent, and tree scent.

5. The deer lure of claim 1, wherein:
    (e) the fragrant liquid is selected from the group consisting of deer urine, raccoon urine, fox urine, acorn scent, and pine scent.

6. The deer lure of claim 1, wherein the brittle member is made of glass.

7. A method for luring deer, the method comprising the steps of:
    (a) sealing a fragrant liquid in a brittle container;
    (b) disposing the brittle container between first and second flexible strips;
   the first strip having first and second ends, and an absorbent middle portion; the second strip having first and second ends, and an absorbent middle portion; the first end of the first strip being attached to the first end of the second strip, and the second end of the first strip being attached to the second end of the second strip; and
    (d) crushing the brittle container, thereby causing the fragrant liquid to escape and be absorbed by the absorbent middle portion of each strip, and to emit a fragrant odor from the liquid and from the absorbent middle portions of the strips.

8. The method of claim 7, wherein:
    (e) the first and second strips include an adhesive material; and
    (f) the adhesive material is used to attach the first and second ends of the first and second strips to one another.

9. The method of claim 7, wherein:
    (e) the fragrant liquid has a scent which attracts deer.

10. The method of claim 7, wherein:
    (e) the fragrant liquid is selected from the group consisting of urine, nut scent, and tree scent.

11. The method of claim 7, wherein:
    (e) the fragrant liquid is selected from the group consisting of deer urine, raccoon urine, fox urine, acorn scent, and pine scent.

12. The method of claim 7, wherein:
    (e) the brittle container is made of glass.

* * * * *